United States Patent
Azizi et al.

(10) Patent No.: US 9,313,075 B2
(45) Date of Patent: Apr. 12, 2016

(54) METHODS AND ARRANGEMENTS FOR CHANNEL UPDATES IN WIRELESS NETWORKS

(71) Applicant: Intel Corporation, Santa Clara, CA (US)

(72) Inventors: Shahrnaz Azizi, Cupertino, CA (US); Eldad Perahia, Portland, OR (US); Thomas J. Kenney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 13/730,935

(22) Filed: Dec. 29, 2012

(65) Prior Publication Data

US 2014/0050255 A1 Feb. 20, 2014

Related U.S. Application Data (60) Provisional application No. 61/684,609, filed on Aug. 17, 2012.

(51) Int. Cl.
| | |
|---|---|
| *H04B 1/69* | (2011.01) |
| *H04L 27/26* | (2006.01) |
| *H04L 5/00* | (2006.01) |
| *H04L 25/02* | (2006.01) |

(52) U.S. Cl.
CPC .......... *H04L 27/2666* (2013.01); *H04L 5/0048* (2013.01); *H04L 27/2657* (2013.01); *H04L 27/2675* (2013.01); *H04L 27/2695* (2013.01); *H04L 25/022* (2013.01); *H04L 25/0224* (2013.01)

(58) Field of Classification Search
USPC .................. 375/219, 340, 226, 343, 136, 329
See application file for complete search history.

(56) References Cited

U.S. PATENT DOCUMENTS

| | | |
|---|---|---|
| 2004/0190637 A1 | 9/2004 | Maltsev et al. |
| 2006/0067420 A1 | 3/2006 | Li et al. |
| 2008/0219340 A1 | 9/2008 | Saed |
| 2009/0060075 A1 | 3/2009 | Mohebbi |

(Continued)

FOREIGN PATENT DOCUMENTS

WO    2014/028133 A1    2/2014

OTHER PUBLICATIONS

International Preliminary Report on Patentability and Written Opinion received for PCT Patent Application No. PCT/US2013/048818, mailed on Feb. 26, 2015, 13 pages.

(Continued)

*Primary Examiner* — Eva Puente
(74) *Attorney, Agent, or Firm* — Schubert Law Group PLLC (57) ABSTRACT

Logic may calculate predicted phase rotations based upon more than one previously determined phase rotation. Logic may access memory to store and retrieve previously determined phase rotations to calculate predicted phase rotations. Logic may determine channel information updates such as channel state information and phase correction information from pilot tones that do not travel close to the direct current (DC) tone or the band edge (or guard) tones and replace the missing phase rotations with predicted phase rotations. Logic may skip phase tracking from pilot tones that have traveled close to the DC tone or the edge tones or that experience channel fading, which may result in a predicted phase rotation being more accurate than a phase rotation determined by processing the corresponding pilot tone.

26 Claims, 5 Drawing Sheets

(56) References Cited

U.S. PATENT DOCUMENTS

| | | |
|---|---|---|
| 2009/0225822 A1 | 9/2009 | Tupala et al. |
| 2009/0238306 A1* | 9/2009 | Honda et al. .................. 375/329 |
| 2010/0260233 A1* | 10/2010 | Luong et al. .................. 375/136 |
| 2011/0150149 A1* | 6/2011 | Lee et al. ...................... 375/343 |
| 2012/0087403 A1* | 4/2012 | Kim et al. ..................... 375/226 |
| 2013/0107992 A1* | 5/2013 | Arambepola et al. ........ 375/340 |
| 2013/0322507 A1* | 12/2013 | Yu et al. ....................... 375/226 |

OTHER PUBLICATIONS

International Search Report and Written Opinion received for PCT Patent Application No. PCT/US2013/048818, mailed on Oct. 18, 2013, 16 pages.

* cited by examiner

METHODS AND ARRANGEMENTS FOR CHANNEL UPDATES IN WIRELESS NETWORKS

BACKGROUND

Embodiments are in the field of wireless communications. More particularly, the present disclosure relates to channel updates to attenuate the impact of direct current-offset and adjacent channel interference by predicting phase rotations.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Institute of Electrical and Electronic Engineers (IEEE) 802.11ah systems have bandwidths currently defined are 1 MHz (MegaHertz) and a set of down-clocked IEEE 802.11ac rates, namely 2, 4, 8 and 16 MHz, where the down clocking is 10×. The 1 MHz system may use a 32-point fast Fourier transform (FFT). Of those 32 carriers, 24 will be used for data and 2 for pilot. Additionally, a repetition mode is being included to extend range.

One of the issues for IEEE 802.11ah wireless networks is that with the lower data rates of the IEEE 802.11ah system, and the added use case of outdoor sensor and offloading, the Channel Doppler effect becomes significant for longer packets. For example, using the 1 MHz mode, a packet with moderate to large payload sizes can exceed tens of milliseconds. The packet times were much lower for the IEEE 802.11n/ac system, which was largely designed for indoor use, and thus the channel was assumed stationary over the entire packet. It has been shown that for modest Doppler, the IEEE 802.11ah system performance may be severely degraded without additional training, or channel updates, during the transmission of long packets.

Embodiments may use of known pilot symbol tones shifting across the bandwidth of the orthogonal frequency division multiplexing (OFDM) packet during transmission of the packet to allow receivers to track the channel information during the transmission of the packet. Thus, the pilot information can be used to compute channel updates to the channel state information for those tones and the phase correction information to track channel phase with different tones.

IEEE 802.11ah devices may include, e.g., indoor and outdoor sensors and cellular offloading. Low cost devices are less likely to have stringent filtering for adjacent channel interference (ACI) and advanced algorithm to compensate direct current (DC) offset. When pilot tones travel toward DC or the bandwidth edge tones, impairments from DC offset and ACI can considerably impair the ability to make accurate estimates. When tones close to the DC tone or the band edge tones are used as data tones, channel coding compensates for the impact of DC-offset or ACI, while if those tones are pilot tones, degradation from DC-offset or ACI propagates to channel estimates and phase tracking that in turn causes overall performance degradation.

Furthermore, the presence of reflectors in the environment surrounding a transmitter and receiver may create multiple paths that a transmitted signal can traverse. As a result, the receiver can receive a superposition of multiple copies of the transmitted signal, each traversing a different path. Each signal copy may experience differences in attenuation, delay and phase shift while travelling from the source to the receiver. This can result in either constructive or destructive interference, amplifying or attenuating the signal power seen at the receiver. The effect of destructive interference is referred to as channel fading and the fading can be detected by, e.g., variations in the signal-to-noise ratio (SNR). Strong destructive interference is frequently referred to as a deep fade and may result in temporary failure of communication due to a severe drop in the channel SNR. The channel fading may also significantly impair the ability to determine accurate phase rotations by processing the pilot tones.

Embodiments may calculate predicted phase rotations based upon more than one previously determined phase rotation as well as calculate predicted channel estimates based upon more than one previously determined channel estimate. Logic may access memory to store and retrieve previously determined phase rotations and channel estimates to calculate predicted phase rotations and weight coefficients. Logic may determine channel information updates such as channel state information and phase correction information from pilot tones that do not travel close to the direct current (DC) tone or the band edge tones and replace the missing phase rotations with predicted phase rotations and the missing channel estimates with predicted channel estimates. Logic may skip phase tracking and channel estimates from pilot tones that have traveled close to the DC tone or the edge tones or that experience channel fading, which may result in a predicted phase rotation being more accurate than a phase rotation determined by processing the corresponding pilot tone or a predicted channel estimate being more accurate than a channel estimate determined by processing the corresponding pilot tone.

In some embodiments, the pilot logic may process pilot tones at any location within OFDM packet. For instance, the pilot logic may determine to process only pilot tones at the odd symbol indices or subcarriers (e.g., $-11, -9, -7, \ldots$) and to predict phase rotations rather than process pilot tones on even subcarriers ($-12, -10, \ldots$). In further embodiments, the access point may transmit an OFDM packet with pilot tones shifting through only selected locations and the pilot logic may process those pilot tones while predict phase rotations for the locations that were not selected, and the pilot logic may process those pilot tones while not computing updated channel estimates for the locations that were not selected. For not selected locations, instead of computing new channel estimates, channel estimates of adjacent locations can be used or, in some embodiments, new channel estimates are predicted or interpolated.

In many embodiments, transmitters shift the location of the pilot tones every N symbols, where N may be a system parameter, setting, or a fixed value. Thus, the location of the pilot tones remain constant for N symbols before shifting to the next location. In several embodiments, a receiver may then use the N pilot symbols to make a channel estimate using an appropriate algorithm. Some embodiments described herein may implement the pilot shifting with N fixed to a value of one, which it means the pilots would shift every symbol and the implementation of a fixed value for N may also remove a need of signaling between transmitter and receiver to update the value of N because the single value used at the transmitter may be predetermined.

It is understood that embodiments that skip channel estimates and phase correction updates have a degraded performance. However, this degradation may be negligible since skipping pilot tones may happen infrequently, e.g., twice in every 13 OFDM symbols for 1 MHz systems, and even less frequently with 2, 4, 8, and 16 MHz systems where the skipping would be even less frequent. Predicting phase rotations for the phase tracking loop may improve this performance. A simulation study conducted on an embodiment that skips processing tones although it does not include predicting phase rotations to illustrate potential performance improvements.

Various embodiments may be designed to address different technical problems associated with channel updates with shifting pilot tones. For instance, some embodiments may be designed to address one or more technical problems such as phase tracking with shifting pilot tones for which the phase rotations determined through processing may be degraded by channel fading or shifted toward the DC and/or edge tones in, e.g., low cost sensors that may not have stringent filtering and advanced algorithms to compensate for adjacent channel interference and DC offset.

Different technical problems such as those discussed above may be addressed by one or more different embodiments. For instance, some embodiments that address phase tracking with shifting pilot tones for which the phase rotations determined through processing may be degraded by channel fading or shifted toward the DC and/or edge tones may do so by one or more different technical means such as predicting phase rotations in conjunction with skipping the processing of shifting pilot tones for which the phase rotations determined through processing may be less accurate than predicted phase rotations such as pilot tones degraded by channel fading or shifted toward the DC and/or edge tones in, e.g., low cost sensors that may not have stringent filtering and advanced algorithms to compensate for adjacent channel interference and DC offset, and the like.

Some embodiments implement Institute of Electrical and Electronic Engineers (IEEE) 802.11 systems such as IEEE 802.11ah systems and other systems that operate in accordance with standards such as the IEEE 802.11-2012, IEEE Standard for Information technology≥Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2012.pdf).

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services may generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
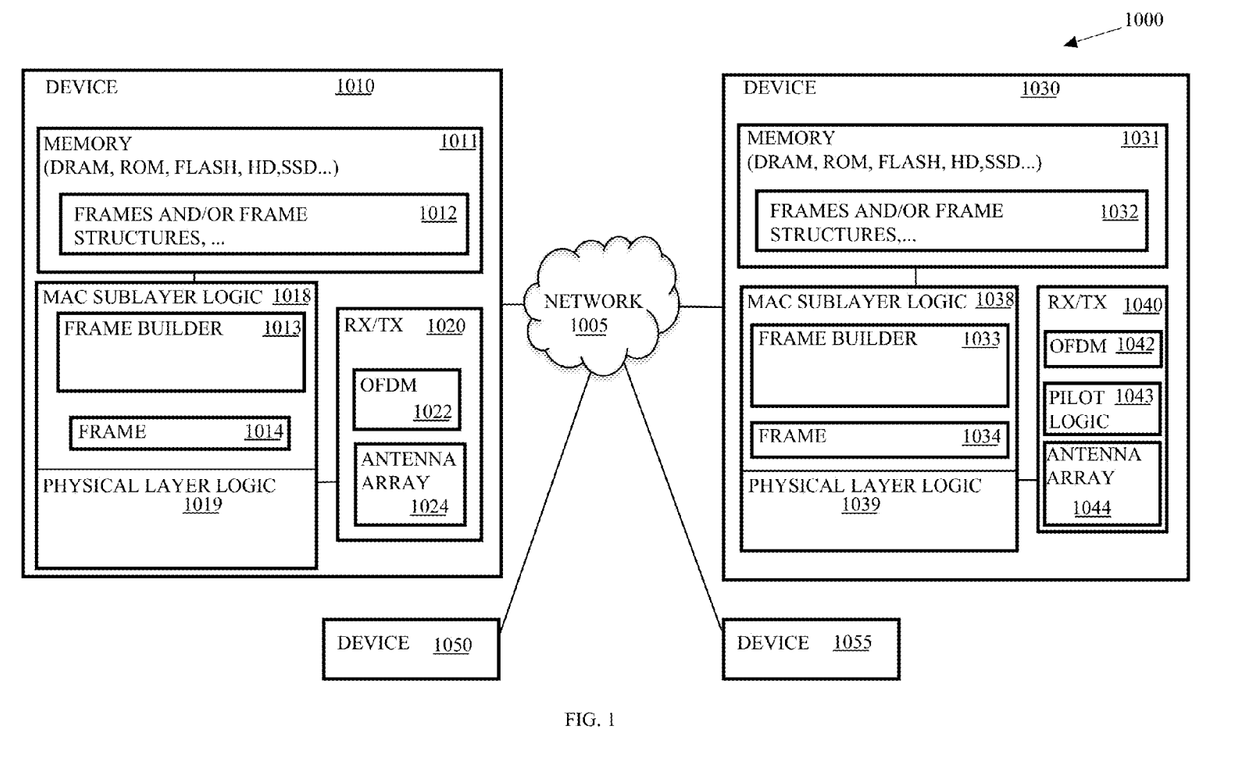
FIG. 1 depicts an embodiment of a wireless network comprising a plurality of communications devices.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water usage meter.

When the communications device 1010 transmits a packet to the communications device 1030 to notify the communications device 1030 that, e.g., the communications device 1010 is buffering data for the communications device 1030, the communications device 1010 may transmit an orthogonal frequency division multiplexing (OFDM) packet encapsulating a frame 1014. The OFDM 1022 of the transceiver (RX/TX) 1020 may generate the transmission with pilot tones shifting locations within the symbol indices of the transmission every N symbols. In some embodiments, the communications device 1010 may have previously transmitted an indication of the value of N to the communications device 1030. In such embodiments, the indication may be transmitted within frame 1014, e.g., a field in the header may numerate N. In further embodiments, the value of N may be a fixed value. And, in some embodiments, the value of N is fixed at a value of one.

The communications device 1010 may transmit the OFDM packet one symbol after the other sequentially and every N symbols, the location of the pilot tones within the OFDM packet may change either sequentially or randomly. In some embodiments, the location of the pilot tones may shift by one symbol index, or, in other words, from one sub-carrier to the adjacent sub-carrier.

Pilot tone shifting is a process where the pilot tones are sequentially assigned to different subcarriers as a function of time. In many embodiments, only a subset of subcarriers may be used for pilot tones or data purposes (usable sub-carriers). For example, the pilot tones may be used only on data sub-carriers (e.g., sweep through with the pilot tone on a symbol by symbol basis), may avoid nulled sub-carriers (e.g., DC subcarriers and guard subcarriers), an, in some embodiments, may even avoid data tones that are adjacent to guard or DC subcarriers, and further in some embodiments may avoid a subset of data tones, for example all even numbered tones.

Figure 1A:
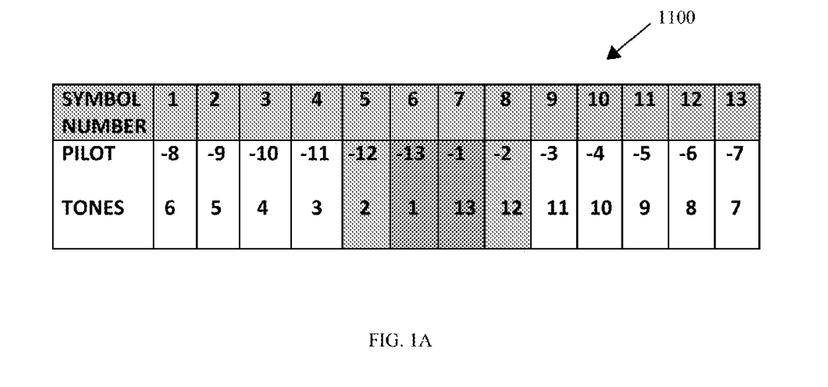
FIG. 1A depicts an embodiment of a table illustrating pilot tone locations and processing pilot tones except for the pilot tones at locations near the direct current (DC) and edge (or guard) tones.

The pilot tones and their positioning can be based on channel conditions such as coding scheme, packet length, and the like. FIG. 1A depicts a table 1100 of pilot tone positions demarked by symbol numbers. The following discussion is for the 1 MHz systems and is an example. There are other allocations for the 2, 4, 8 and 16 MHz bandwidths.

The table 1100 shows a progression of symbols transmitted from the communications device 1010 to the communications device 1030 from 1 to 13. The number of symbols is chosen in the present embodiment based upon the number of data and pilot tones, or useable sub-carriers, and the pattern of pilot locations in relation to the symbol indices repeat after 13. In particular, the table 1100 illustrates two pilot tones for each symbol number. One pilot tone travels between the −13 subcarrier index and a −1 subcarrier index and the second pilot tone travels between the 1 subcarrier index and the 13 subcarrier index. For example, the first symbol transmitted may be symbol 1, which has two pilot tones, one located at the subcarrier index −8 and one located at the subcarrier index 6. The second symbol transmitted may then be symbol 2 with pilot tones at the subcarrier indices −9 and 5. The third symbol transmitted may then be symbol 3 with pilot tones at the subcarrier indices −10 and 4 and these pilot tone shifts continue through symbol 13 at which the pilot tones are at the subcarrier indices −7 and 7.

As shown in the table 1100, the pilot tones are shifted or assigned to different tones (sub-carriers) or frequency bins as a function of time, which is referred to herein as the locations of the pilot tone. The time between shifts in the location of the pilot tones is N=1 in table 1100 so the pilot tones shift between locations between every symbol. The table 1100 also illustrates the pilot tones changing by one subcarrier index at a time and sequentially. However, not all embodiments may implement a location for pilot tones as a function of time that results in the pilot tones shifting through sub-carriers or frequencies sequentially. In other words, the location of the pilot tones may shift every N symbols {N=1, 2, 3, 4 . . . , 8, . . . } but the shift in frequency/location may be random within the subset of sub-carriers rather than sequential. The shifting of the pilot tones can also be based on the modulation and coding scheme (MCS) used for transmission or on the packet length of the transmission (i.e., channel conditions). Further, the amount of time the one or more pilot tones occupy a particular location may be based on a modulation and coding scheme (MCS) and the MCS may be selected based on a data rate and a level of robustness required by traffic type. After a set of pilot tones are assigned, the process illustrated by the table 1100 is cyclic and may be repeated over any number of symbols greater than 13.

The communications device 1030 may receive the transmission from the communications device 1010 and may utilize channel information determined by processing the pilot tones to repeatedly or, in some embodiments, continually update the channel information with all pilot information except information determined from pilot tones at locations adjacent to the DC tone or edge tones. The communications device 1030 may implement pilot logic 1043 to receive and process the pilot tones to determine channel information (sometimes referred to as pilot information) and to use the channel information to update processing of the data signals received for the OFDM packet. The pilot logic 1043 may also store the channel information including phase rotations determined by processing the pilot tones.

In some embodiments, the pilot logic 1043 may comprise predictive logic to predict phase corrections or rotations for phase tracking and, in some embodiments, predicted channel estimates for updating weight coefficients for equalization. In particular, the predictive logic may store phase rotations determined by processing and retrieve the phase rotations to predict that phase rotation of a pilot tone that is impaired such as a pilot tone that is near the DC tone or near an edge tone, or a pilot tone that is received during channel fading. In some embodiments, the predictive logic may determine, based upon the proximity of the pilot tone to the DC tone or edge tone, or by the degradation of the SNR due to channel fading that the predictive logic may predict a more accurate phase rotation than the phase rotation determined from the processing the pilot tone and, in response, the predictive logic may replace the phase rotation determined or to be determined by processing with a predicted phase rotation for phase tracking. In some embodiments, the predictive logic may implement predictive filtering such as linear forward predictive filtering. In some embodiments, the predicted phase rotation and channel estimates may also be provided to an equalizer to update the weight coefficients for equalization.

In the present embodiment, the pilot logic 1043 may receive the OFDM packet with pilot tones distributed across the bandwidth of the OFDM packet in accordance with the table 1100. The table 1100 provides an example of a pattern for 1 MHz system (32 tones FFT, 24 data and 2 pilot tones in each symbol) based on which pilots travel one symbol to another covering the entire bandwidth after 13 symbols. The pattern repeats periodically to cover all symbols in a packet.

In other embodiments, 1 MHz receivers use all pilot locations to update channel estimates and track phase throughout the OFDM packet. In the present embodiment, the communications device 1030 may be a low cost receiver that does not have stringent DC-offset and ACI filtering. In the present embodiment, the pilot logic 1043 may skip processing pilot tones that are close to DC and/or edge tones. As illustrated in the table 1100, symbol indices 6 and 7, and their periodic occurrence on every 13 symbols have pilot tones at locations {−13, 1} and {−1, 13} that are next to DC or edge tones. The phase correction information for symbol index 5 and several of its prior indices are calculated previously. The predictive logic can use these previously calculated correction amounts to predict the phase correction amount of the next symbol. For example predictive logic may calculate that on average moving from symbol index 4 to symbol index 5 would be equivalent to "the phase correction of symbol 4+δ. Therefore, the predictive logic may predict that moving from symbol index 5 to the skipped index 6, requires "the phase correction of index 5+δ. This predicted phase correction information is used for phase correction of symbol index 6, instead of using pilots {−13, 1} for new calculations. Note that this is only one example because there are many known methods of predictive filtering that may be implemented in a particular embodiment. Similarly, the channel estimates are predicted and used for channel estimates of symbol index 6.

Figure 1B:
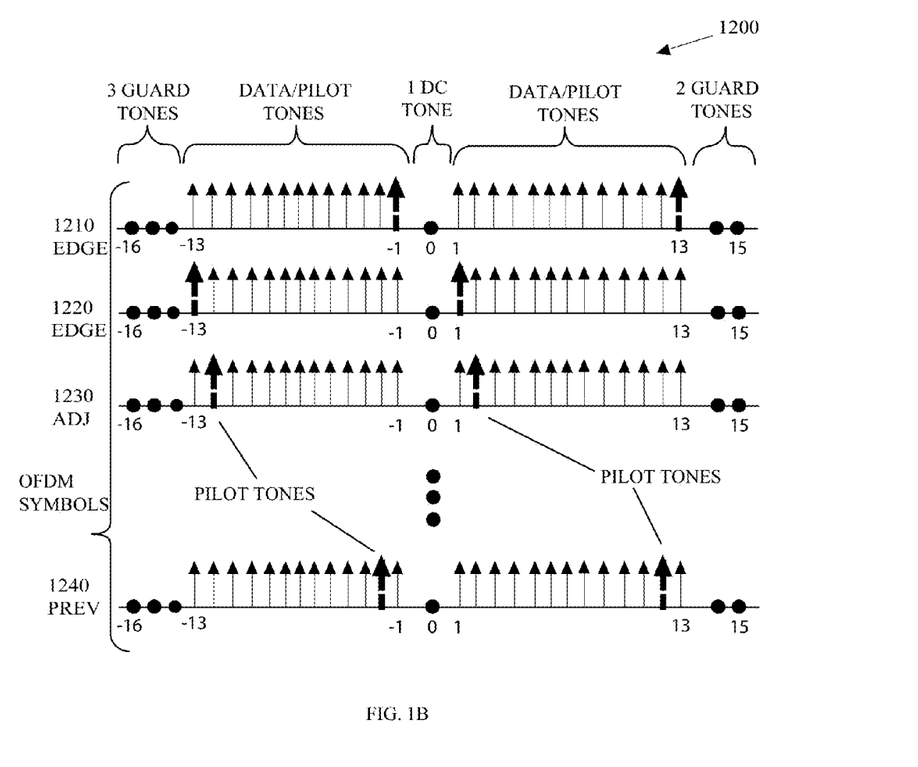
FIG. 1B depicts embodiments of orthogonal frequency division multiplexing (OFDM) symbols in an OFDM packet transmission with shifting pilot tones.

FIG. 1B illustrates an embodiment of the OFDM packet 1200 transmitted from the communications device 1010 to the communications device 1030. The OFDM module 1022 may generate different OFDM symbols for different bandwidths such a 2 MHz, 4 MHz, 8 MHz, and 16 MHz and may generate the OFDM packet 1200 for a 1 MHz bandwidth channel, for transceivers such as the transceivers of FIG. 1, corresponding to a 32-point, inverse Fourier transform. The OFDM packet 1200 comprises 32 tones, also referred to as sub-carriers, indexed from −16 to 15. The 32 tones, in this embodiment, include 24 data tones, five guard tones, two pilot tones, and one direct current (DC) tone. The four lowest frequency tones are guard tones provided for filter ramp up and filter ramp down. The index zero frequency tone is the DC tone and is nulled, at least in part, to better enable the receivers to employ direct-conversion receivers to reduce complexity. As per a commonplace practice, the DC is selected to be one of the two subcarriers closest to the middle of the frequency band. And the data and pilot frequency tones are provided between indices −13 through −1 and indices 1 through 13.

The RF receiver comprises an OFDM module 1042, which receives electromagnetic energy at an RF frequency and extracts the digital data therefrom. For 1 MHZ operation, OFDM 1042 may extract OFDM symbols comprising 24 data tones, five guard tones, and one DC tone such as the OFDM symbol 1210 illustrated in FIG. 1B. In other embodiments, the OFDM symbols may be encoded in other manners with different numbers of data tones, pilot tones, and guard tones.

Note that the OFDM packet 1200 comprises OFDM symbols 1210, 1220, 1230, through 1240 and the OFDM symbols correspond to the pilot tone pattern illustrated in table 1100. In particular, the OFDM symbols 1210-1240 illustrate a dot for each of the guard tones, which are also referred to as edge tones. There is one dot in the center of the symbols 1210-1240 illustrating the position of the DC tone as symbol index 0, and the DATA/PILOT TONES are demarked with numbers that start at the subcarrier index −13 on the left side through the −1 index next to the DC tone at the 0 index, and continue with index 1 adjacent to the DC index 0 through the index 13 adjacent to the guard tones on the right side.

As indicated in with respect to table 1100, in the present embodiment, the pilot logic 1043 may skip processing pilot tones that are close to DC or edge tones. The OFDM symbol 1220 illustrates the OFDM symbol index 6 in table 1100 and the pilot tones are the emboldened arrows at subcarrier indices {−13, 1}. Note that the OFDM symbol 1210 has pilot tones {−1, 13} adjacent to the DC tone and the guard tones. The OFDM symbol 1220 has pilot tones {−13, 1} adjacent to the DC tone and the guard tones. The OFDM symbol 1230 has pilot tones {−12, 2} adjacent to the location of the symbol index that is adjacent to the DC tone and the guard tones. And, the OFDM symbol 1230 has pilot tones {−2, 12} adjacent to the location of the symbol index that is adjacent to the DC tone and the guard tones.

In the present embodiment, the pilot logic 1043 may implement predictive logic to calculate a predicted phase rotation or phase correction in lieu of or to replace the results of processing the pilot tones that are adjacent to the DC or edge tones or even tones at any location that may be subject to fading. In further embodiments, the pilot logic 1043 may skip processing of pilot tones for other reasons and the predictive logic may determine phase corrections to fill in the gaps. Similarly, the predictive logic may calculate channel estimates for those pilot tones.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, medium access control (MAC) sublayer logic 1018 and 1038, and physical layer (PHY) logic 1019 and 1039, respectively. The memory 1011 and 1031 may comprise a storage medium such as dynamic random access memory (DRAM), read only memory (ROM), buffers, registers, cache, flash memory, hard disk drives, solid-state drives, or the like. The memory 1011 and 1031 may store frames and/or frame structures, or portions thereof such as structures for an association request frame, an association response frame, a probe frame, and the like.

The MAC sublayer logic 1018, 1038 may comprise logic to implement functionality of the MAC sublayer of the data link layer of the communications device 1010, 1030. The MAC sublayer logic 1018, 1038 may generate the frames and the physical layer logic 1019, 1039 may generate physical layer protocol data units (PPDUs) based upon the frames. For example, the frame builder may generate frames 1014, 1034. The physical layer logic 1019, 1039 may encapsulate the frames with preambles to generate PPDUs for transmission via a physical layer device such as the transceivers represented by receive/transmit chains (RX/TX) 1020 and 1040.

The communications devices 1010, 1030, 1050, and 1055 may each comprise a transceiver (RX/TX) such as transceivers (RX/TX) 1020 and 1040. In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data as OFDM symbols. The OFDM symbols are divided into several parallel data streams or channels, one for each sub-carrier and encoded with the sub-carriers by which the OFDM symbols will be transmitted to a receiving device such as twenty-four data sub-carriers, five guard sub-carriers, two pilot sub-carriers, and one DC subcarrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. And guard tones may help the signal conform to a spectral mask. The nulling of the direct component (DC) may be used to simplify direct conversion receiver designs. And guard intervals may be inserted between symbols such as between every OFDM symbol as well as between the short training field (STF) and long training field (LTF) symbols by the front-end of the transmitter during transmission to avoid inter-symbol interference (ISI), which might result from multi-path distortion.

Each transceiver 1020, 1040 comprises an RF transmitter and an RF receiver. The RF transmitter comprises an OFDM module 1022, which impresses digital data, OFDM symbols encoded with tones, onto RF frequencies, also referred to as sub-carriers, for transmission of the data by electromagnetic radiation. In the present embodiment, the OFDM module 1022 may impress the digital data as OFDM symbols encoded with tones onto the sub-carriers to for transmission.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044.

Figure 1C:
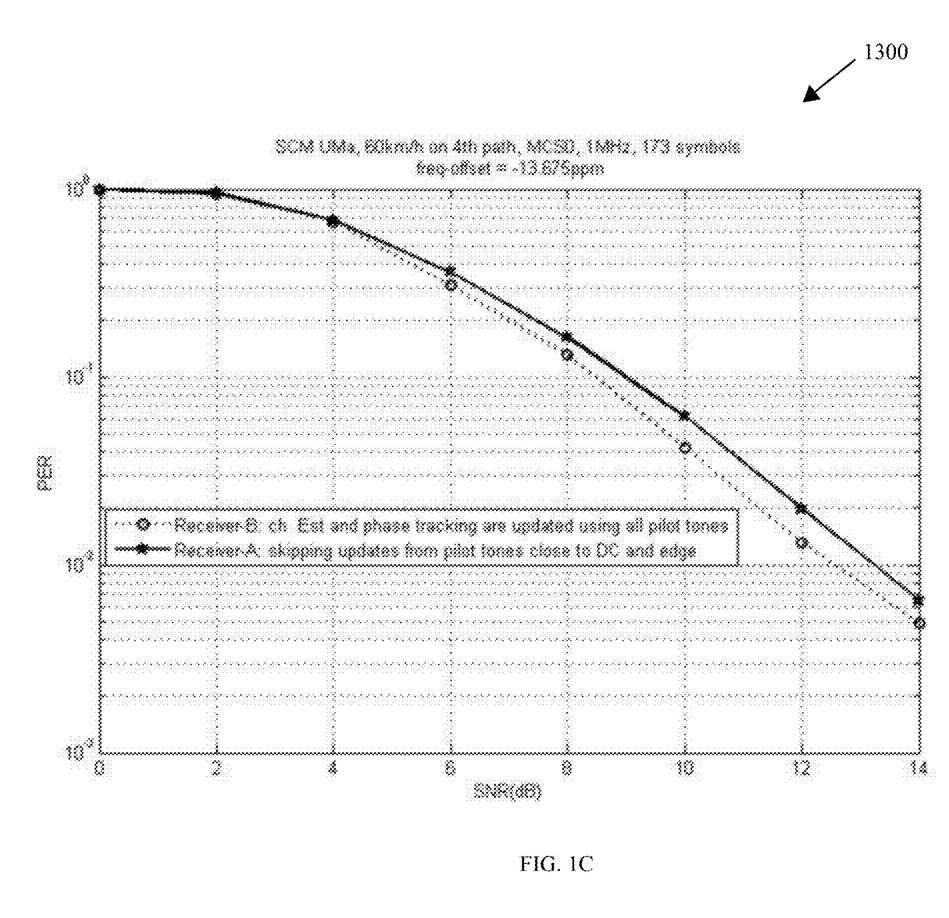
FIG. 1C depict embodiments of a simulation comparing the processing of all pilot tones against processing pilot tones except for the pilot tones at locations near the DC and edge tones.

FIG. 1C depicts embodiments of a simulation 1300 of the process implemented in the pilot logic 1043 of skipping channel estimates and phase correction updates derived directly from the pilot tones at locations that are adjacent to the DC tone or the edge tones. However, as illustrated in the simulation results, the expected degradation may be negligible since skipping pilot tones happens very infrequently (twice in every 13 symbols) and the filtering in phase tracking loop is able to pull the performance back within a threshold range. In FIG. 1C, the graph shows packet error rate (PER) performance of two receivers. Receiver-A implements the pilot logic such as pilot logic 1043 in which pilot tones close to DC-offset and the edge are not used to update channel estimates and phase correction. Receiver-B is a normal receiver that considers updates from all traveling pilots. It is observed that the pilot logic 1043 in the low cost receiver-A follows the performance of Receiver-B with only 0.5 decibel (dB) degradation. This simulation study was conducted with the modulation and coding scheme zero (MCS0) in an IEEE 802.11ah device operating at 1 MHz using a 256-byte packet using all simulation impairments and a carrier offset of −13.675 parts per million (ppm).

Therefore, the pilot logic 1043 may be implemented in low cost sensor devices without need of any stringent requirement on DC-offset and/or ACI rejection while maintaining performance to within 0.5 dB of that of the high-end receivers.

Figure 2:
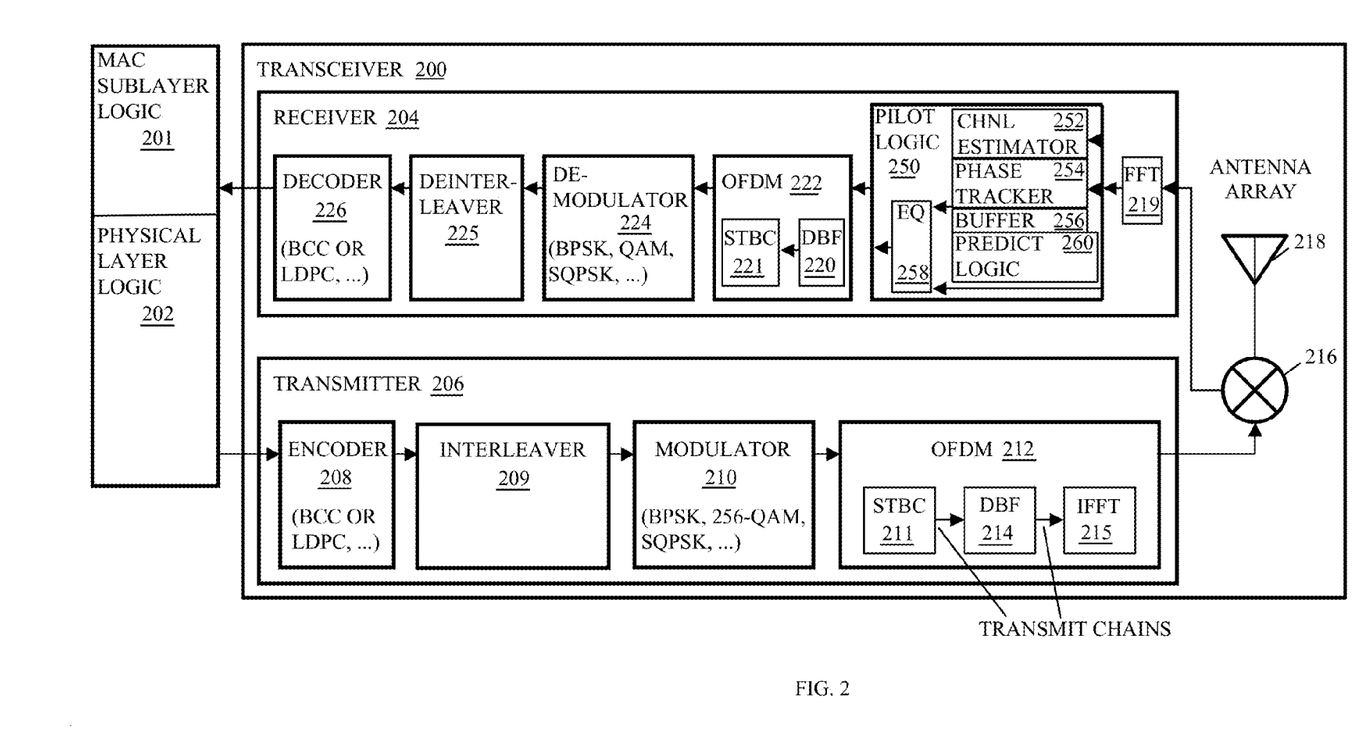
FIG. 2 depicts an embodiment of an apparatus with pilot logic to process shifting pilot tones with predictive logic to predict phase rotations.

FIG. 2 depicts an embodiment of an apparatus to generate, transmit, receive, and interpret or decode frames. The apparatus comprises a transceiver 200 coupled with Medium Access Control (MAC) sublayer logic 201 and a physical layer (PHY) logic 250. The MAC sublayer logic 201 may determine a frame and the physical layer (PHY) logic 250 may determine the PPDU by encapsulating the frame or multiple frames, MAC protocol data units (MPDUs), with a preamble to transmit via transceiver 200. For example, a frame builder may generate a frame including a type field that specifies whether the frame is a management, control or data frame and a subtype field to specify the function of the frame. A control frame may include a Ready-To-Send or Clear-To-Send frame. A management frame may comprise a Beacon, Probe Response, Association Response, and Reassociation Response frame type. And the data type frame is designed to transmit data.

In many embodiments, the MAC sublayer logic 201 may comprise a frame builder 202 to generate frames. The PHY logic 250 may comprise a data unit builder 203. The data unit builder 203 may determine a preamble to encapsulate the MPDU or more than one MPDUs to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid.

The output of modulator 209 is fed to an orthogonal frequency division multiplexing (OFDM) module 212. The OFDM module 212 may comprise a space-time block coding (STBC) module 211, a digital beamforming (DBF) module 214, and an inverse, fast Fourier transform (IFFT) module 215. The STBC module 211 may receive constellation points from the modulator 209 corresponding to one or more spatial streams and may spread the spatial streams to a greater number of space-time streams (also generally referred to as data streams). In some embodiments, the STBC 211 may be controlled to pass through the spatial streams for situations in which, e.g., the number of spatial streams is the maximum number of space-time streams. Further embodiments may omit the STBC.

The OFDM module 212 impresses or maps the modulated data formed as OFDM symbols onto a plurality of orthogonal sub-carriers so the OFDM symbols are encoded with the sub-carriers or tones. The OFDM module 212 may generate symbols in which the pilot tones change location within the data/pilot sub-carriers every N symbols. In many embodiments, the OFDM module 212 may generate symbols in which the pilot tones shift locations along the symbol indices sequentially. In several embodiments, the pilot tones may shift locations every symbol. For instance, when the communications device 1030 in FIG. 1 responds to a transmission from the communications device 1010, the RX/TX 1040 may respond with OFDM packets in which the pilot tones shift every N symbols. In some embodiments, the value of N may match the value of N provided by the communications device 1010. In other embodiments, the value of N may be a fixed value for the communications device 1030 and/or for the communications device 1010. And, in some embodiments, the communications device 1010, which may be the access point, may use a value of N provided to the communications device 1010 by the communications device 1030.

In some embodiments, the OFDM symbols are fed to the Digital Beam Forming (DBF) module 214. Digital beam forming techniques may be employed to increase the efficiency and capacity of a wireless system. Generally, digital beam forming uses digital signal processing algorithms that operate on the signals received by, and transmitted from, an array of antenna elements. For example, a plurality of spatial channels may be formed and each spatial channel may be steered independently to maximize the signal power transmitted to and received from each of a plurality of user terminals. Further, digital beam forming may be applied to minimize multi-path fading and to reject co-channel interference.

The OFDM module 212 may also comprise an inverse Fourier transform module that performs an inverse discrete Fourier transform (IDFT) on the OFDM symbols. In the present embodiment, the IDFT may comprise the IFFT module 215, to perform an IFFT on the data. For 1 MHz bandwidth operation, the IFFT module 215 performs a 32-point, inverse FFT on the data streams.

The output of the OFDM module 212 may be up-converted to a higher carrying frequency or may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal. In other embodiments, the transceiver 200 may comprise one or more antennas rather than antenna arrays and, in several embodiments, the receiver 204 and the transmitter 206 may comprise their own antennas or antenna arrays.

The transceiver 200 may comprise a receiver 204 for receiving, demodulating, and decoding information bearing communication signals. The communication signals may comprise, e.g., 32 tones on a 1 MHz carrier frequency with pilot tones that shift every N symbols. For example, a data collection station compliant with IEEE 802.11ah for a farm may periodically receive data from low power sensors that have integrated wireless communications devices compliant with IEEE 802.11ah. The sensors may enter a low power mode for a period of time, wake to collect data periodically, and communicate with the data collection station periodically to transmit the data collected by the sensor. In some embodiments, the sensor may proactively initiate communications with the data collection station, transmit data indicative of a communications capability, and begin communicating the data to the data collection station in response to a clear-to-send (CTS) or the like. In other embodiments, the sensor may transmit data to the data collection station in response to initiation of communications by the data collection station.

The receiver 204 may comprise a fast Fourier transform (FFT) module 219. The FFT module 219 may transform the communication signals from the time domain to the frequency domain.

The receiver 204 may comprise a pilot logic 250 comprising a channel estimator 252, a phase tracker 254, a buffer 256, an equalizer 258, and a predictive logic 260. The pilot logic 250 may be configured for processing shifting pilot tones as well as data tones. The receiver 204 may comprise an equalizer 258 with hard-coded logic or running an equalizer application or instructions, a channel estimator 252, and a phase tracker 254.

The pilot logic 250 may comprise filters, delay elements, and taps or other logic to apply weighting functions to the input signal based upon weight values determined and updated from processing the pilot tones in the incoming signal. The weight coefficients for the weighting functions are weight values which may be adjusted based on the pilot tones to achieve a specific level of performance, and to, e.g., optimize signal quality at the receiver. In some embodiments, the pilot logic 250 is able to track channel changes over time (i.e., using the pilot tones to update the equalizer weight coefficients) because of the rotation of the pilot tones through each of the OFDM subcarriers over the OFDM packet through time. As noted above, the pilot tones are separated by some number of data subcarriers so that estimation of slope and intercept for subcarrier tracking could be maintained. As the pilot tones are shifted through symbol index locations across the band of the OFDM packet, the weight coefficients for the equalizer for the subcarriers that the pilot tones currently populate may be updated as well.

The receiver 204 may receive and convert the pilot tones to a baseband representation. The received pilot tones may then be input into the channel estimator 252 that uses the received sequences to determine updated channel estimates for the wireless channel (using, for example, a least squares approach). The channel estimator 252 may have a priori knowledge of the transmitted pilot tones, which it compares to the received signals to determine the channel estimates. The channel estimates may then be delivered to the equalizer 258.

The baseband representation of the received data signals may be delivered to the input of the equalizer 258, which filters the signals in a manner dictated by the weighting function in accordance with the weight coefficients currently being applied to the equalizer 258. The equalizer 258 may include any type of equalizer structure (including, for example, a transversal filter, a maximum likelihood sequence estimator (MLSE), and others). When properly configured, the equalizer 258 may reduce or eliminate undesirable channel effects within the received signals (e.g., inter-symbol interference).

The received data signals with pilot tones 210 are also delivered to the input of the phase tracker 254, which uses the received signals to track the weight coefficients applied to the equalizer 258. During system operation, the phase tracker 254 regularly updates the weight coefficients based on the magnitude and phase of the pilot tones. In addition to the receive data, the phase tracker 254 also receives data from an output of the equalizer 258 as feedback for use in the phase tracking or phase correction process. The phase tracker 254 uses the initial channel estimates determined by the channel estimator 252 to determine the weight coefficients covariance matrix (C). The phase tracker 254 may then determine the value of the constant b (related to the channel changing rate) and calculate the weight coefficients changing covariance matrix (b*C). The square root of the weight coefficients changing covariance matrix may then be determined and used within a modified least mean square (LMS) algorithm to determine the updated channel weight coefficients, which are then applied to the equalizer 258.

The pilot logic 250 also comprises a buffer 256 to store channel information such as phase correction information from the phase tracker 254. In some embodiments, the pilot logic 250 may store previously determined phase correction information determined from pilot tones of the OFDM symbols. The buffer 260 may also be used to store channel information such as channel estimates information used in the equalizer 258. In some embodiments, the pilot logic 250 may store previously determined channel estimate information determined from pilot tones of the OFDM symbols.

In several embodiments, the pilot logic 250 may skip processing the pilot tones that are next to, or adjacent to, the DC tone and the edge tones or that are subject to fading and, instead, implement predictive logic 260 to calculate phase correction and channel information such as phase rotations and channel estimates from more than one of the phase rotations and channel estimates stored in the buffer 256. For instance, the predictive logic 260 may calculate a phase rotation that is the most repeated phase rotation, the mean phase rotation, the median phase rotation, or the like for, e.g., the all stored phase rotations, stored phase rotations from the same location, stored phase rotations from the same location and adjacent locations, stored locations within a certain number of symbol indices of the pilot tone location, stored locations within a window of time about the pilot tone location, or the like.

In some embodiments, the pilot tones may not reach locations adjacent to the DC tone or the edge tones at the same time. These embodiments operate in the same manner because the predictive logic 260 may calculate a predicted phase rotation for each pilot tone location independently of calculating the predicted phase rotation for other pilot tone locations.

In some embodiments, there is a possibility that a pilot tone may shift to three different locations that are adjacent to the edge tones or the DC tone such as embodiments, for instance, that shift pilot tones to randomly selected locations. In such embodiments, the pilot logic 250 may follow the same general rule to calculate a predicted phase rotation and channel estimate for the pilot tone location.

In some embodiments, the pilot logic 250 may skip pilot tones at any location within OFDM packet. In one embodiment, the pilot logic 250 may determine to process only pilot tones at the odd symbol indices or subcarriers (e.g., −11, −9, −7, . . . ) and to calculate a predicted phase rotation and channel estimate for each even pilot tone location rather than process pilot tones on even subcarriers (−12, −10, . . . ). In further embodiments, the access point may transmit an OFDM packet with pilot tones shifting through only selected locations and the pilot logic 250 may process those pilot tones while calculating a predicted phase rotation and channel estimate for each of the locations that were not selected.

The receiver 204 may also comprise an OFDM module 222, a demodulator 224, a deinterleaver 225, and a decoder 226, and the equalizer 258 may output the weighted data signals for the OFDM packet to the OFDM module 222. The OFDM 222 extracts signal information as OFDM symbols from the plurality of subcarriers onto which information-bearing communication signals are modulated. For instance, the OFDM symbols may comprise data associated with 24 data sub-carriers, two pilot sub-carriers, five guard sub-carriers, and one DC sub-carrier.

The OFDM module 222 may comprise a DBF module 220, and an STBC module 221. The received signals are fed from the equalizer to the DBF module 220 transforms N antenna signals into L information signals. And the STBC module 221 may transform the data streams from the space-time streams to spatial streams. In one embodiment, the demodulation is performed in parallel on the output data of the FFT. In another embodiment, a separate demodulator 224 performs demodulation separately.

The demodulator 224 demodulates the spatial streams. Demodulation is the process of extracting data from the spatial streams to produce demodulated spatial streams. The method of demodulation depends on the method by which the information is modulated onto the received carrier signal and such information is included in the transmission vector (TX-VECTOR) included in the communication signal. Thus, for example, if the modulation is BPSK, demodulation involves phase detection to convert phase information to a binary sequence. Demodulation provides to the deinterleaver 225 a sequence of bits of information.

The deinterleaver 225 may deinterleave the sequence of bits of information. For instance, the deinterleaver 225 may store the sequence of bits in columns in memory and remove or output the bits from the memory in rows to deinterleave the bits of information. The decoder 226 decodes the deinterleaved data from the demodulator 224 and transmits the decoded information, the MPDU, to the MAC sublayer logic 202.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated.

For example, digital beam forming may be integrated with orthogonal frequency division multiplexing.

The MAC sublayer logic 201 may decode or parse the MPDU or MPDUs to determine the particular type of frame or frames included in the MPDU(s).

Figure 3A:
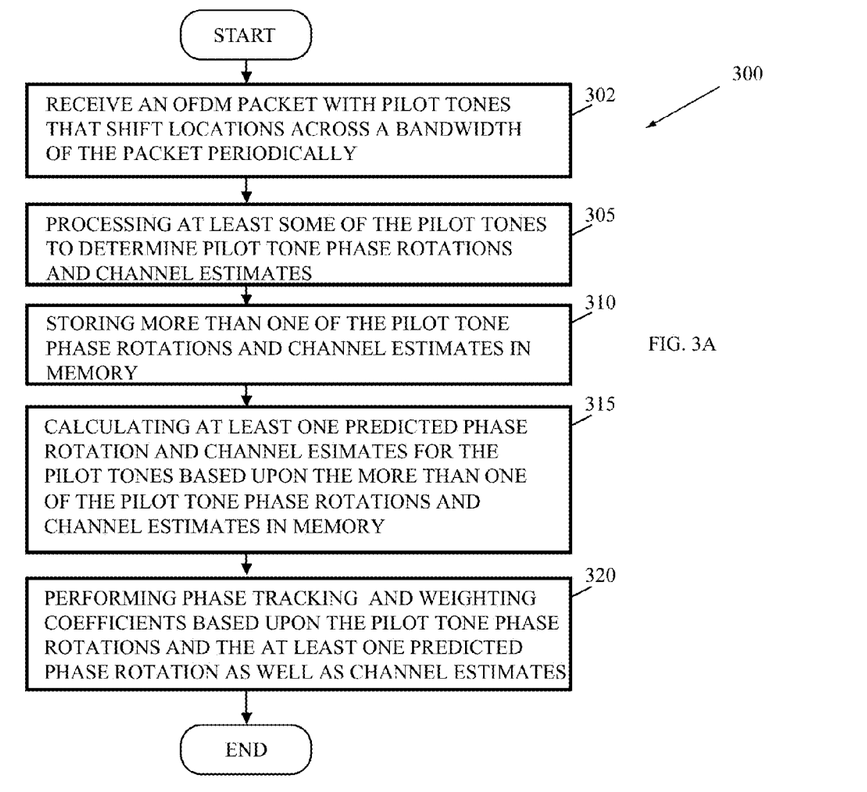
FIGS. 3A-B depict embodiments of flowcharts to process pilot tones including prediction of phase rotations and to generate, transmit, receive, parse, and interpret communications.
Figure 3B:
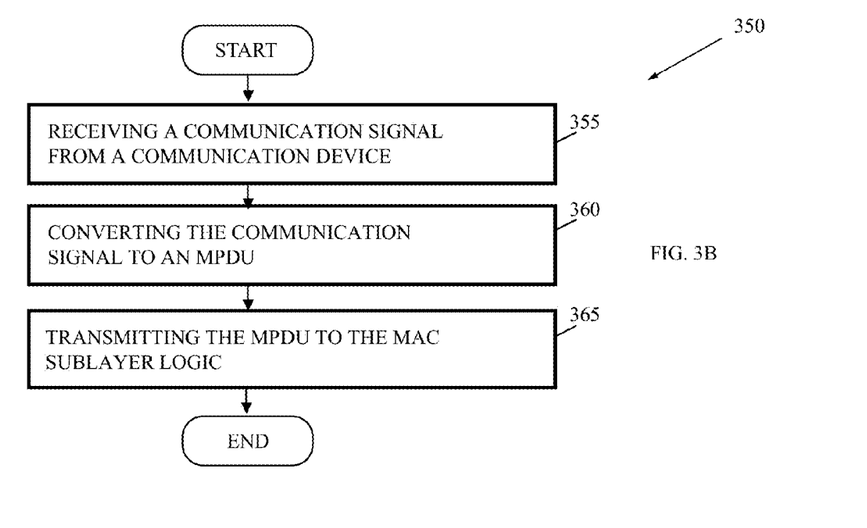

FIGS. 3A-B depict embodiments of flowcharts to process pilot tones including prediction of phase rotations and to generate, transmit, receive, parse, and interpret communications. Referring to FIG. 3A, the flowchart 300 may begin with receiving an OFDM packet with pilot tones that shift locations of across the bandwidth of the packet periodically (element 302). In many embodiments, the OFDM packet may be received one symbol at a time and the pilot tones may shift to a new location every N symbols, where N may be a settable, calculated or fixed value. Thus, the pilot tones' locations may remain constant for N symbols before shifting to the next location.

After the receiver begins to receive the OFDM packet, the receiver may begin to process at least some of the pilot tones to determine pilot tone phase rotations (element 305). For instance, in some embodiments, the receiver may skip processing pilot tones that are at locations that are adjacent to the DC tone or the edge tones, that are affected by fading, or that are skipped for other reasons. In other embodiments, the receiver may process all the pilot tones but not use the phase rotations determined by processing selected pilot tones.

While processing pilot tones, the receiver may store more than one of the determined phase rotations and channel estimates in memory (element 310). In other words, the receiver may determine the locations that the prediction logic may use to calculate predicted phase rotations and channel estimates for the pilot tones such as pilot tones at locations that are adjacent to the DC tone or the edge tones or may otherwise not be processed to determine pilot tone phase rotations and/or channel estimates.

When the receiver receives OFDM symbols in which one or more of the pilot tones are located adjacent to the DC tone or the edge tones, the receiver may access the buffer in and retrieve the appropriate information to calculate at least one predicted phase rotation and/or channel estimate for the pilot tones (element 315). For instance, in some embodiments, the predictive logic may calculate the average phase difference between two or more of the previously determined and/or calculated phase rotations and add the average phase difference to the previously used phase rotation to determine the phase rotation for phase tracking. And the receiver may use the predicted phase rotation to update the phase of the channel (element 320).

Referring to FIG. 3B, the flowchart 350 begins with a receiver of a station such as the receiver 204 in FIG. 2 receiving a communication signal via one or more antenna(s) such as an antenna element of antenna array 218 (element 355). The communication signal may comprise the pilot tones that shift to new locations every N symbols. Thus, the pilot tone location remains constant for N symbols, then shifts to the next location. The receiver may then use the N pilot symbols to make a channel estimate using an appropriate algorithm. In many embodiments, the receiver may not process or may not use information determined from processing pilot tones adjacent to DC or edge tones. The receiver may calculate predicted phase corrections and/or channel estimates for the pilot tone locations that are adjacent to the DC and edge tones.

The receiver may convert the communication signal into one or more MPDUs in accordance with the process described in the preamble (element 360). More specifically, the received signal may be fed from the one or more antennas to a pilot logic such as pilot logic 250 for equalization and phase correction and then to a DBF such as the DBF 220. The DBF transforms the signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the one or more MPDUs (element 360) and transmits the one or more MPDUs to MAC sublayer logic such as MAC sublayer logic 202 (element 365).

The MAC sublayer logic may parse and interpret the frame in each of the MPDUs. For instance, the MAC sublayer logic may parse and interpret the frame to determine the frame type and subtype.

The following examples pertain to further embodiments. One example comprises a method. The method may involve receiving an orthogonal frequency division multiplexing transmission with pilot tones shifting locations periodically between subcarrier indices of orthogonal frequency division multiplexing symbols; processing at least some of the pilot tones to determine pilot tone phase rotations; storing more than one of the pilot tone phase rotations and channel estimates in memory; calculating at least one predicted phase rotation and channel estimate for the pilot tones based upon the more than one of the pilot tone phase rotations and channel estimates in memory; and performing phase tracking based upon the pilot tone phase rotations and channel estimates and the at least one predicted phase rotation and channel estimate.

In some embodiments, the method may further comprise calculating a predicted phase rotation for a pilot tone location that is not adjacent to a direct current tone or edge tones based upon pilot tone phase rotations in the memory, wherein performing the phase tracking comprises phase tracking based upon the predicted phase rotation for the pilot tone location in place of a pilot tone rotation determined for the pilot location. In some embodiments, processing at least some of the pilot tones to determine pilot tone phase rotations comprises skipping processing of the pilot tones that are located adjacent to a direct current tone or edge tones. In many embodiments, calculating at least one predicted phase rotation for the pilot tones comprises calculating, for a pilot tone location that is adjacent to the direct current tone or the edge tones, with the more than one phase rotations from the memory, a predicted phase rotation for the pilot tone. In several embodiments, receiving comprises receiving the orthogonal frequency division multiplexing transmission via an antenna array. In several embodiments, calculating at least one predicted phase rotation for the pilot tones based upon the more than one of the pilot tone phase rotations in memory comprises applying predictive filtering to determine the at least one predicted phase rotation. In several embodiments, receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every N orthogonal frequency division multiplexing symbols. And, in some embodiments, receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every orthogonal frequency division multiplexing symbol.

In some embodiments, the method may further comprise calculating a predicted channel estimates for a pilot tone location that is not adjacent to a direct current tone or edge tones based upon pilot tone channel state information in the memory, wherein performing the equalization comprises equalization based upon the predicted channel estimates for the pilot tone location in place of channel estimates determined for the pilot location. In some embodiments, processing at least some of the pilot tones to determine pilot tone channel estimates comprises skipping processing of the pilot tones that are located adjacent to a direct current tone or edge tones. In many embodiments, calculating at least one predicted channel estimate for the pilot tones comprises calculating, for a pilot tone location that is adjacent to the direct current tone or the edge tones, with the more than one channel estimates from the memory, a predicted channel estimates for the pilot tone. In several embodiments, receiving comprises receiving the orthogonal frequency division multiplexing transmission via an antenna array. In several embodiments, calculating at least one predicted channel estimate for the pilot tones based upon the more than one of the pilot tone channel estimates in memory comprises applying predictive filtering to determine the at least one predicted channel estimate. In several embodiments, receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every N orthogonal frequency division multiplexing symbols. And, in some embodiments, receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every orthogonal frequency division multiplexing symbol.

Another example comprises an apparatus. The apparatus may comprise a memory to store pilot tone phase rotations; logic coupled with the memory to receive an orthogonal frequency division multiplexing transmission with pilot tones shifting locations periodically between subcarrier indices of orthogonal frequency division multiplexing symbols; process at least some of the pilot tones to determine pilot tone phase rotations; calculating at least one predicted phase rotation for the pilot tones based upon more than one of the pilot tone phase rotations in memory; and perform phase tracking based upon the pilot tone phase rotations and the at least one predicted phase rotation.

In some embodiments, the apparatus may further comprise an antenna array coupled with the logic to receive the orthogonal frequency division multiplexing transmission. In some embodiments, the logic comprises logic to calculate a predicted phase rotation for a pilot tone location that is not adjacent to a direct current tone or edge tones based upon pilot tone phase rotations in the memory, wherein performing the phase tracking comprises phase tracking based upon the predicted phase rotation for the pilot tone location in place of a pilot tone rotation determined for the pilot location. In some embodiments, the logic comprises logic to skip processing of the pilot tones that are located adjacent to a direct current tone or edge tones. In some embodiments, the logic comprises logic to calculate, for a pilot tone location that is adjacent to a direct current tone or edge tones, with the more than one phase rotations from the memory, a predicted phase rotation for the pilot tone. In some embodiments, the logic comprises logic to apply predictive filtering to determine the at least one predicted phase rotation. In some embodiments, the logic comprises logic to receive the orthogonal frequency division multiplexing transmission with pilot tones shifting the pilot tones every N orthogonal frequency division multiplexing symbols. And, in some embodiments, the logic comprises logic to receive the orthogonal frequency division multiplexing transmission with pilot tones shifting the pilot tones every orthogonal frequency division multiplexing symbol.

Another example comprises a system. The system may comprise memory to store pilot tone phase rotations; a receiver coupled with the memory to receive an orthogonal frequency division multiplexing transmission with pilot tones shifting locations periodically between subcarrier indices of orthogonal frequency division multiplexing symbols; process at least some of the pilot tones to determine pilot tone phase rotations; calculating at least one predicted phase rotation for the pilot tones based upon more than one of the pilot tone phase rotations in memory; and perform phase tracking based upon the pilot tone phase rotations and the at least one predicted phase rotation and a transmitter to transmit a second orthogonal frequency division multiplexing transmission with pilot tones shifting locations periodically.

In some embodiments, the system may further comprise an antenna array coupled with the receiver to receive the orthogonal frequency division multiplexing transmission and the transmitter to transmit the second orthogonal frequency division multiplexing transmission. In some embodiments, the receiver comprises logic to calculate a predicted phase rotation for a pilot tone location that is not adjacent to a direct current tone or edge tones based upon pilot tone phase rotations in the memory, wherein performing the phase tracking comprises phase tracking based upon the predicted phase rotation for the pilot tone location in place of a pilot tone rotation determined for the pilot location. In some embodiments, the receiver comprises logic to skip processing of the pilot tones that are located adjacent to a direct current tone or edge tones. In some embodiments, the receiver comprises logic to calculate, for a pilot tone location that is adjacent to a direct current tone or edge tones, with the more than one phase rotations from the memory, a predicted phase rotation for the pilot tones. In some embodiments, the receiver comprises logic to apply predictive filtering to determine the at least one predicted phase rotation. In some embodiments, the receiver comprises logic to receive the orthogonal frequency division multiplexing transmission with pilot tones shifting the pilot tones every N orthogonal frequency division multiplexing symbols. And, in some embodiments, the receiver comprises logic to receive the orthogonal frequency division multiplexing transmission with pilot tones shifting the pilot tones every orthogonal frequency division multiplexing symbol.

The following examples pertain to further embodiments. One example comprises a machine-accessible product. The machine-accessible product may comprise a medium containing instructions for channel estimation with shifting pilot tones, wherein the instructions, when executed by a station, causes the station to perform operations, the operations comprising: receiving an orthogonal frequency division multiplexing transmission with pilot tones shifting locations periodically between subcarrier indices of orthogonal frequency division multiplexing symbols; processing the pilot tones to determine channel information that excludes channel information for the pilot tones that are located adjacent to a direct current tone or edge tones; and performing channel estimation based upon the channel information.

In some embodiments, the operations may further comprise storing phase correction information for pilot tone locations adjacent to locations that are adjacent to the DC tone or the edge tones in memory; and for a pilot tone location that is adjacent to the DC tone or the edge tones, processing previously obtained phase correction information from the memory for phase tracking. In some embodiments, the operations may further comprise storing channel state information for pilot tone locations adjacent to locations that are adjacent to the DC tone or the edge tones in memory; and for a pilot tone location that is adjacent to the DC tone or the edge tones, processing previously obtained channel state information from the memory for a location adjacent to the pilot tone location to equalize the pilot tone. In many embodiments, the operations may further comprise skipping processing of the pilot tones that are located adjacent to the direct current tone or the edge tones. In several embodiments, the operations may further comprise receiving comprises receiving the orthogonal frequency division multiplexing transmission via an antenna array. In several embodiments, processing the pilot tones to determine channel information comprises determining channel state information and phase correction information for the channel. In several embodiments, receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every N orthogonal frequency division multiplexing symbols. And, in some embodiments, receiving an orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every orthogonal frequency division multiplexing symbol.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. A method to update, using pilot tones, channel information regarding a wireless communication channel, the method comprising:
receiving an orthogonal frequency division multiplexing transmission with pilot tones shifting locations periodically between subcarrier indices of orthogonal frequency division multiplexing symbols;
using at least some of the pilot tones to determine phase rotations and channel estimates for the wireless communication channel;
storing more than one of the phase rotations in memory;
calculating at least one predicted phase rotation based upon the more than one of the phase rotations in memory, wherein calculating the at least one predicted phase rotation comprises calculating, for a pilot tone location that is adjacent to the direct current tone or to the edge tones, with the more than one phase rotations from the memory, the at least one predicted phase rotation; and performing phase tracking based upon more than one of the phase rotations and the at least one predicted phase rotation.

2. The method of claim 1, wherein further comprising storing more than one of the channel estimates in memory; calculating at least one predicted channel estimate for the pilot tones based upon the more than one of the channel estimates in memory; and performing phase tracking based upon the channel estimates and the at least one predicted channel estimate.

3. The method of claim 1, wherein receiving the orthogonal frequency division multiplexing transmission with pilot tones shifting locations periodically between symbol indices of orthogonal frequency division multiplexing symbols comprises receiving the orthogonal frequency division multiplexing transmission with pilot tones shifting every N orthogonal frequency division multiplexing symbols, wherein N is an integer that is greater than or equal to 1.

4. The method of claim 1, wherein receiving the orthogonal frequency division multiplexing transmission with pilot tones shifting locations periodically between symbol indices of orthogonal frequency division multiplexing symbols comprises receiving the orthogonal frequency division multiplexing transmission with pilot tones shifting the pilot tones every orthogonal frequency division multiplexing symbol.

5. The method of claim 1, wherein using at least some of the pilot tones to determine pilot tone phase rotations comprises skipping processing of the pilot tones that are located adjacent to a direct current tone or to edge tones.

6. The method of claim 1, wherein calculating comprises calculating a predicted phase rotation for a pilot tone location that is not adjacent to a direct current tone or to edge tones based upon pilot tone phase rotations in the memory, wherein performing the phase tracking comprises phase tracking based upon the predicted phase rotation for the pilot tone location in place of a pilot tone rotation determined for the pilot location.

7. The method of claim 1, wherein calculating at least one predicted phase rotation for the pilot tones based upon the more than one of the pilot tone phase rotations in memory comprises applying predictive filtering to determine the at least one predicted phase rotation.

8. A device to update, using pilot tones, channel information regarding a wireless communication channel, the device comprising:
memory to store phase rotations;
logic coupled with the memory to receive an orthogonal frequency division multiplexing transmission with pilot tones shifting locations periodically between subcarrier indices of orthogonal frequency division multiplexing symbols; use at least some of the pilot tones to determine phase rotations and channel estimates for the wireless communication channel; calculation of at least one predicted phase rotation based upon more than one of the phase rotations in memory, wherein calculation of the at least one predicted phase rotation comprises calculation, for a pilot tone location that is adjacent to the direct current tone or to the edge tones, with the more than one phase rotations from the memory, of the at least one predicted phase rotation; and perform phase tracking based upon the phase rotations and the at least one predicted phase rotation.

9. The device of claim 8, wherein:
the memory comprises memory to store channel estimates; and
the logic comprises logic to process at least some of the pilot tones to determine channel estimates; calculate at least one predicted channel estimate based upon more than one of the channel estimates in memory; and perform equalization based upon the channel estimates and the at least one predicted channel estimate.

10. The device of claim 8, wherein the logic comprises logic to calculate a predicted phase rotation for a pilot tone location that is not adjacent to a direct current tone or edge tones based upon pilot tone phase rotations in the memory, wherein performing the phase tracking comprises phase tracking based upon the predicted phase rotation for the pilot tone location in place of a pilot tone rotation determined for the pilot location.

11. The device of claim 8, wherein the logic comprises logic to skip processing of the pilot tones that are located adjacent to a direct current tone or edge tones.

12. The device of claim 8, wherein the logic comprises logic to apply predictive filtering to determine the at least one predicted phase rotation.

13. The device of claim 8, wherein the logic comprises logic to receive the orthogonal frequency division multiplexing transmission with pilot tones shifting the pilot tones every N orthogonal frequency division multiplexing symbols, wherein N is an integer that is greater than or equal to 1.

14. The device of claim 8, wherein the logic comprises logic to receive the orthogonal frequency division multiplexing transmission with pilot tones shifting the pilot tones every orthogonal frequency division multiplexing symbol.

15. A system to update, using pilot tones, channel information regarding a wireless communication channel, the system comprising:
a processor, a radio, and one or more antennas;
memory to store phase rotations;
a receiver coupled with the memory and the radio to receive an orthogonal frequency division multiplexing transmission with pilot tones shifting locations periodically between subcarrier indices of orthogonal frequency division multiplexing symbols; use at least some of the pilot tones to determine phase rotations and channel estimates for the wireless communication channel; calculation of at least one predicted phase rotation based upon more than one of the phase rotations in memory, wherein calculation of the at least one predicted phase rotation comprises calculation, for a pilot tone location that is adjacent to the direct current tone or to the edge tones, with the more than one phase rotations from the memory, of the at least one predicted phase rotation; and perform phase tracking based upon the phase rotations and the at least one predicted phase rotation and
a transmitter coupled with the radio to transmit a second orthogonal frequency division multiplexing transmission with pilot tones shifting locations periodically.

16. The system of claim 15, wherein:
the memory comprises memory to store channel estimates; and
the receiver comprises logic to process at least some of the pilot tones to determine channel estimates; calculate at least one predicted channel estimate for the pilot tones based upon more than one of the channel estimates in memory; and perform equalization based upon the channel estimates and the at least one predicted channel estimate.

17. The system of claim 15, wherein the receiver comprises logic to calculate a predicted phase rotation for a pilot tone location that is not adjacent to a direct current tone or edge tones based upon phase rotations in the memory, wherein performing the phase tracking comprises phase tracking based upon the predicted phase rotation for the pilot tone location in place of a phase rotation determined for the pilot location.

18. The system of claim 15, wherein the receiver comprises logic to skip processing of the pilot tones that are located adjacent to a direct current tone or edge tones.

19. The system of claim 15, wherein the receiver comprises logic to apply predictive filtering to determine the at least one predicted phase rotation.

20. The system of claim 15, wherein the receiver comprises logic to receive the orthogonal frequency division multiplexing transmission with pilot tones shifting every N orthogonal frequency division multiplexing symbols, wherein N is an integer that is greater than or equal to 1.

21. The system of claim 15, wherein the receiver comprises logic to receive the orthogonal frequency division multiplexing transmission with pilot tones shifting every orthogonal frequency division multiplexing symbol.

22. A machine-accessible product comprising:
a non-transitory medium containing instructions to update, using pilot tones, channel information regarding a wireless communication channel, wherein the instructions, when executed by a station, causes the station to perform operations, the operations comprising:
receiving an orthogonal frequency division multiplexing transmission with pilot tones shifting locations periodically between subcarrier indices of orthogonal frequency division multiplexing symbols;
using at least some of the pilot tones to determine phase rotations and channel estimates for the wireless communication channel;
storing more than one of the phase rotations in memory;
calculating at least one predicted phase rotation based upon the more than one of the phase rotations in memory, wherein calculating the at least one predicted phase rotation comprises calculating, for a pilot tone location that is adjacent to the direct current tone or to the edge tones, with the more than one phase rotations from the memory, the at least one predicted phase rotation; and
performing phase tracking based upon more than one of the phase rotations and the at least one predicted phase rotation.

23. The machine accessible product of claim 22, wherein the operations further comprise:
storing more than one of the channel estimates in memory;
calculating at least one predicted channel estimate for the pilot tones based upon the more than one of the channel estimates in memory; and
performing phase tracking based upon the channel estimates and the at least one predicted channel estimate.

24. The machine accessible product of claim 22, processing at least some of the pilot tones to determine pilot tone phase rotations comprises skipping processing of the pilot tones that are located adjacent to a direct current tone or to edge tones.

25. The machine accessible product of claim 22, wherein calculating at least one predicted phase rotation for the pilot tones comprises calculating a predicted phase rotation for a pilot tone location that is not adjacent to a direct current tone or edge tones based upon pilot tone phase rotations in the memory, wherein performing the phase tracking comprises phase tracking based upon the predicted phase rotation for the pilot tone location in place of a pilot tone rotation determined for the pilot location.

26. The machine accessible product of claim 22, wherein calculating at least one predicted phase rotation for the pilot tones based upon the more than one of the pilot tone phase rotations in memory comprises applying predictive filtering to determine the at least one predicted phase rotation.

* * * * *